UNITED STATES PATENT OFFICE.

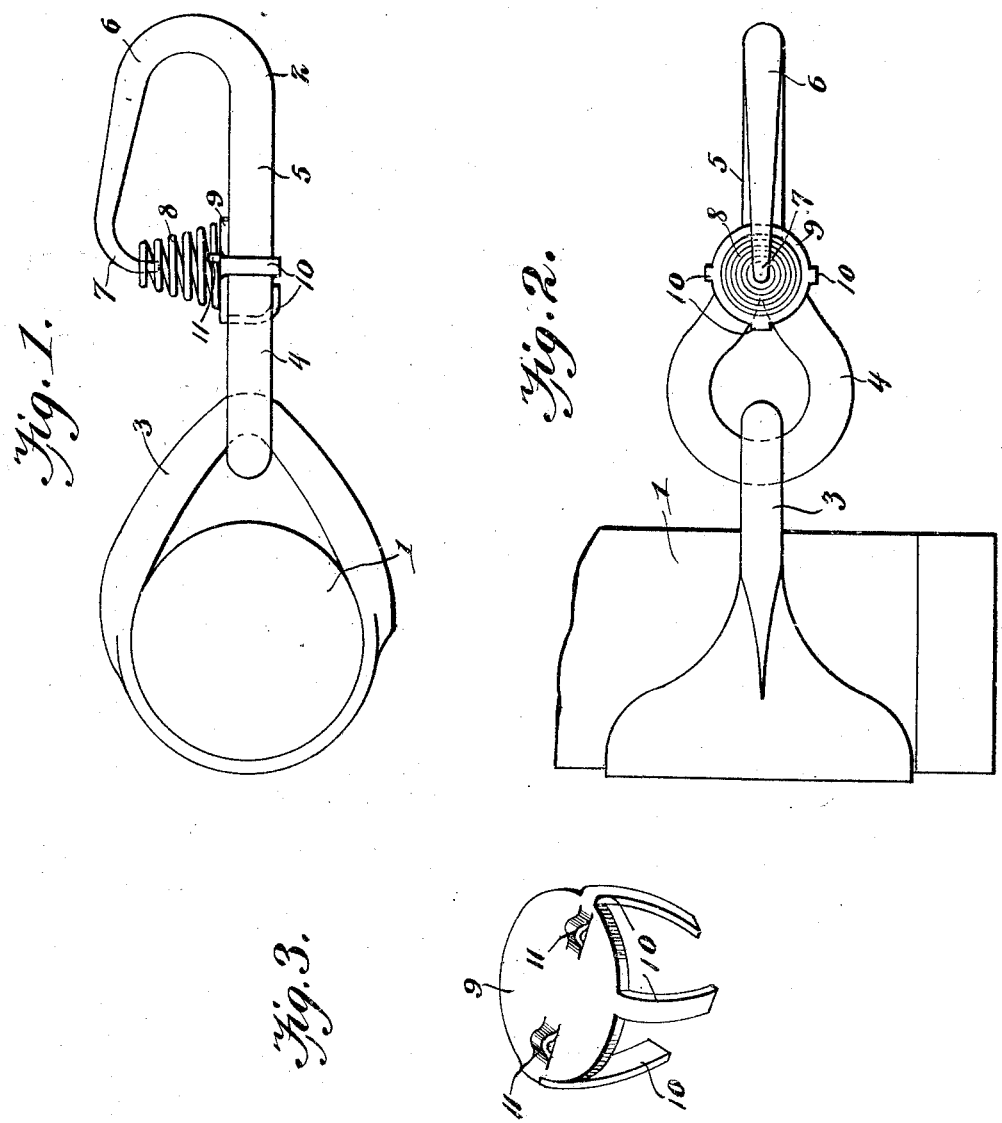

GEORGE D. SIMMONS, OF CLARKSDALE, MISSISSIPPI.

SWINGLETREE ATTACHMENT.

959,082.     Specification of Letters Patent.     Patented May 24, 1910.

Application filed March 7, 1910. Serial No. 547,878.

*To all whom it may concern:*

Be it known that I, GEORGE D. SIMMONS, a citizen of the United States, residing at Clarksdale, county of Coahoma, and State of Mississippi, have invented certain new and useful Improvements in Swingletree Attachments, of which the following is a specification.

My invention relates to swingle or whiffle tree hooks and the object of my invention is to provide a whiffle tree hook equipped with means for preventing the accidental displacement of the trace.

A further object of my invention is to provide a device adapted to be attached to any ordinary whiffle tree hook to prevent accidental displacement of the trace.

Other objects will appear hereinafter.

With these objects in view my invention consists generally in a whiffle tree hook and a coiled conical spring fixed to the shank of the hook and arranged so that the outer convolution or coils of the spring will receive the inturned end of the hook.

My invention further consists in a spring of the character above mentioned provided with means for attaching the same to any ordinary whiffle tree hook.

My invention further consists in various details of construction and arrangements of parts all as will be fully described hereinafter and particularly pointed out in the claims.

My invention will be more readily understood by reference to the accompanying drawings forming a part of this specification and in which—

Figure 1 is side view of a whiffle tree hook embodying my invention in its preferred form, Fig. 2 is plan view of the same, and Fig. 3 is a perspective view of the preferred form of means for securing the spring to the hook.

Referring now to the drawing 1 indicates the end of a whiffle tree, 2 a whiffle tree hook of the ordinary form and 3 the link or ring for connecting the same to the whiffle tree. The hook 2 comprises the usual eye 4, shank 5 and hook proper 6 having the inturned end 7 which terminates preferably above the junction of the shank with the eye.

Fixed to the shank 2 of the hook is a conical spiral spring 8, the upper or smaller convolutions of which are adapted to receive the end 7 of the hook as shown in Fig. 1. The spring is readily compressed by the thumb to permit attaching or removing the trace but will absolutely prevent accidental displacement of the same. The spring 8 is preferably provided with a base 9 which rests upon the shank and which preferably comprises a disk equipped with means for securing the same in position. To this end the disk 9 is preferably provided with a plurality of radial arms or members 10 which are bent about the shank and the adjacent portion of the eye as shown. By this construction a device is provided which may be readily attached to any ordinary whiffle tree hook for the purpose mentioned.

The spring may be attached to the disk 9 in any desired manner but the disk is preferably formed with eyes 11 struck up from the face thereof as shown in Fig. 3 and adapted to receive portions of the lower convolution of the spring. By providing a conically formed spring a broad and stable base is provided and the upper end will form a socket to more snugly receive the end 7 of the hook.

Having described my invention what I claim as new and desire to secure by Letters Patent is:

1. In a whiffle tree hook a shank and a hook thereon having an inturned end, in combination with a conical spiral spring fixed to the shank and adapted to receive said inturned end of the hook in its outer smaller convolution, substantially as described.

2. In a whiffle tree hook a shank and a hook thereon having an inturned end, in combination with a conical spring and means for securing said spring to said shank directly opposite said end and the outer smaller convolution of said spring being adapted to receive said inturned end, substantially as described.

3. An attachment for a whiffle tree hook comprising a base, means on said base for attaching the same to a shank of a whiffle tree hook and a conical coiled spring fixed to said base, substantially as described.

In testimony whereof I have signed my name to this specification in the presence of two subscribing witnesses.

GEORGE D. SIMMONS.

Witnesses:
A. J. DICKES,
J. J. BROWN.